United States Patent

[11] 3,572,807

| [72] | Inventors | Lester W. Haaker;<br>Demetrius G. Jelatis, Red Wing, Minn. |
|---|---|---|
| [21] | Appl. No. | 830,950 |
| [22] | Filed | June 6, 1969 |
| [45] | Patented | Mar. 30, 1971 |
| [73] | Assignee | Central Research Laboratories, Inc.<br>Red Wing, Minn.<br>Continuation-in-part of application Ser. No. 814,265, Apr. 8, 1969, now abandoned. |

[54] ROTARY TONG SQUEEZE SYSTEM
10 Claims, 12 Drawing Figs.

[52] U.S. Cl. .................................................. 294/106,
214/1, 74/89.16
[51] Int. Cl. .................................................. B66c 1/00
[50] Field of Search .................................................. 214/1, 1
(RCM); 294/106; 74/89.16

[56] References Cited
UNITED STATES PATENTS

| 2,959,301 | 11/1960 | Willsea | 214/1 |
|---|---|---|---|
| 3,219,200 | 11/1965 | Aiwsworth | 214/1 |
| 3,503,273 | 3/1970 | Haaker | 214/1 |

*Primary Examiner*—Harvey C. Hornsby
*Attorney*—Burd, Braddock & Bartz

ABSTRACT: A wrist joint for a remote control manipulator having a direct two-way drive rotary tong squeeze system. The rotary tong squeeze system replaces that utilizing a single linear motion tape or cable to close the tong and springs to return to open position. The present wrist joint allows the tong to be driven in both the opening and closing directions using a pair of opposing linear elements to transmit motions from the master arm to tape drums and then through differential gears to the operating members of the tong assembly.

INVENTORS
LESTER W. HAAKER
DEMETRIUS G. JELATIS
BY
Burd, Braddock & Bartz
ATTORNEYS

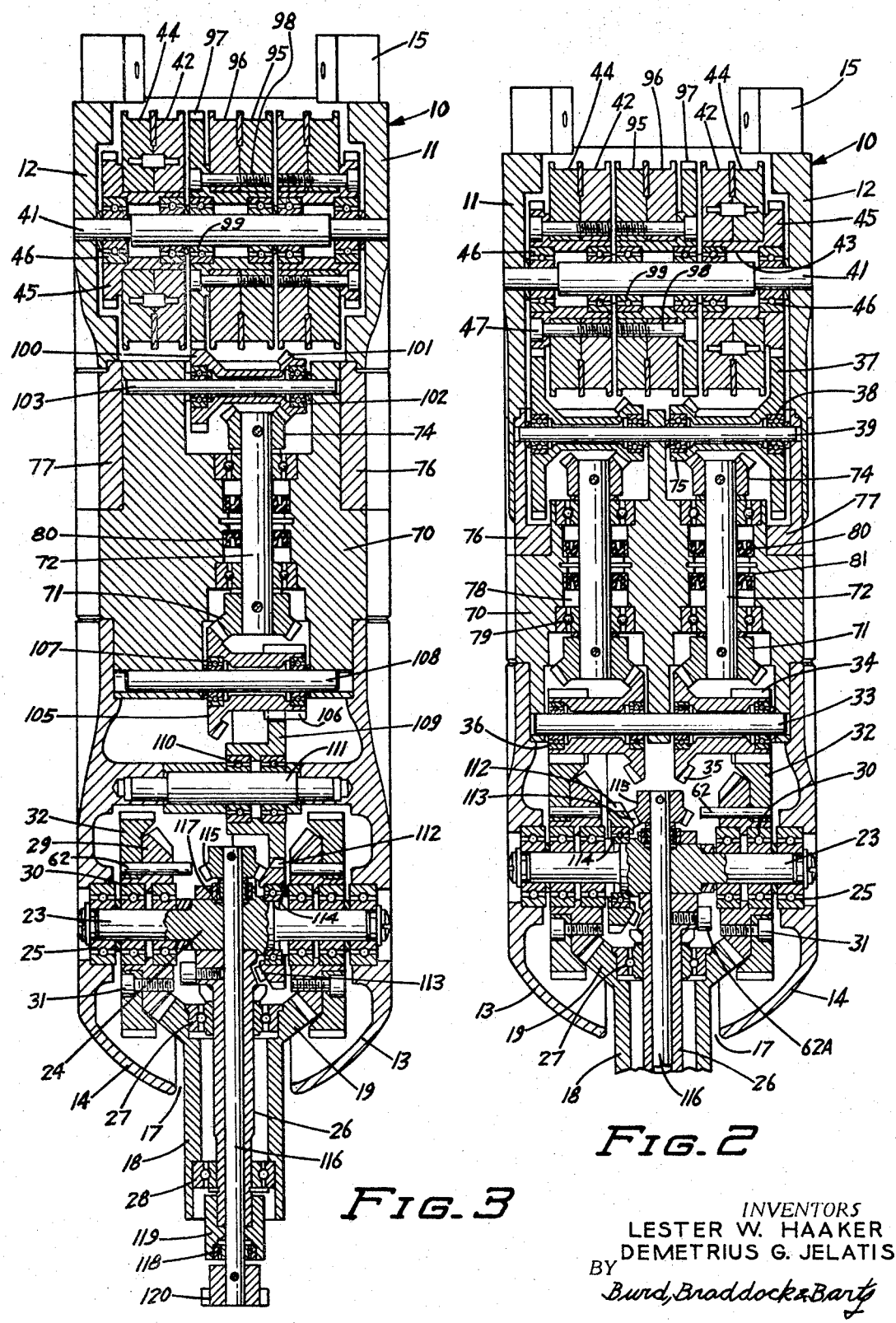

INVENTORS
LESTER W. HAAKER
DEMETRIUS G. JELATIS
BY Burd, Braddock & Bartz

ATTORNEYS

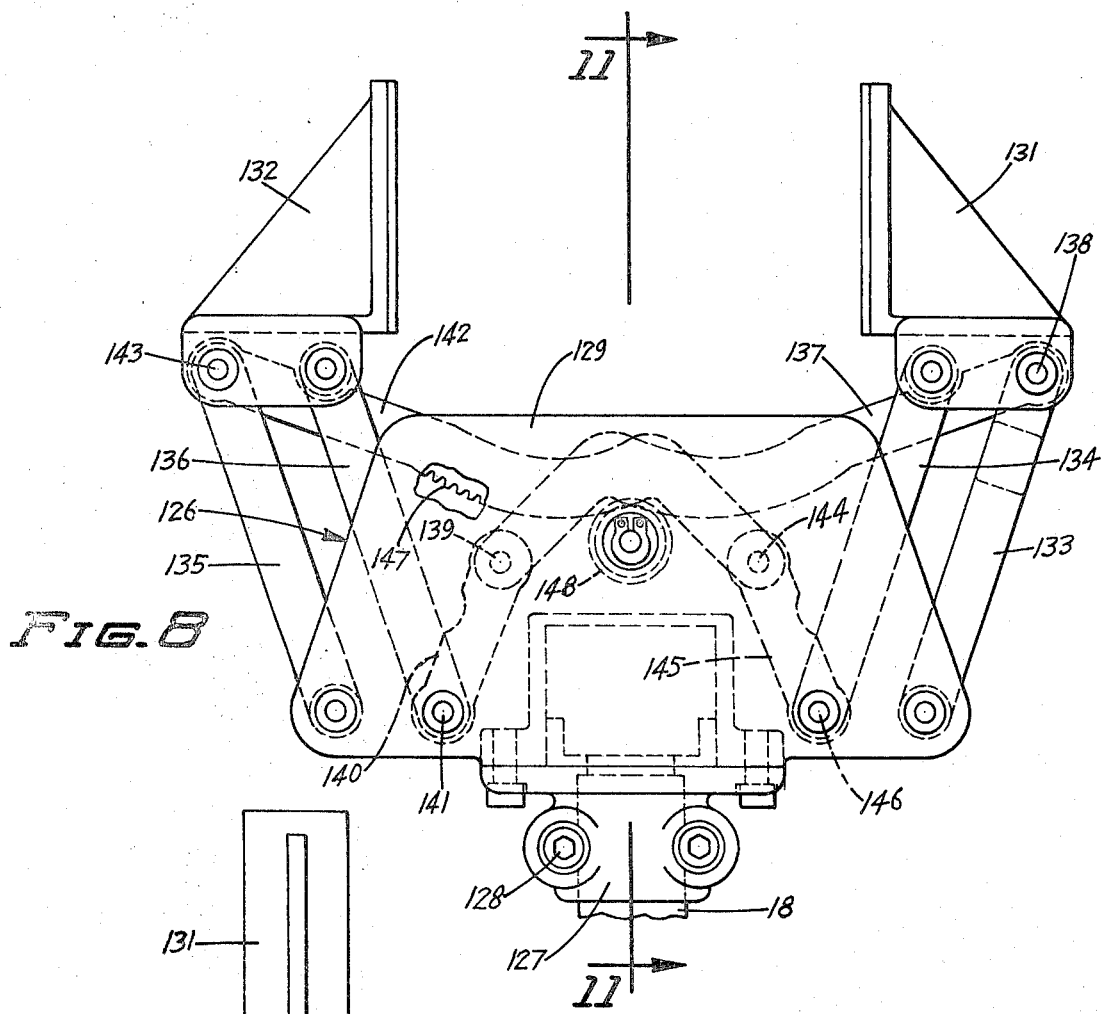
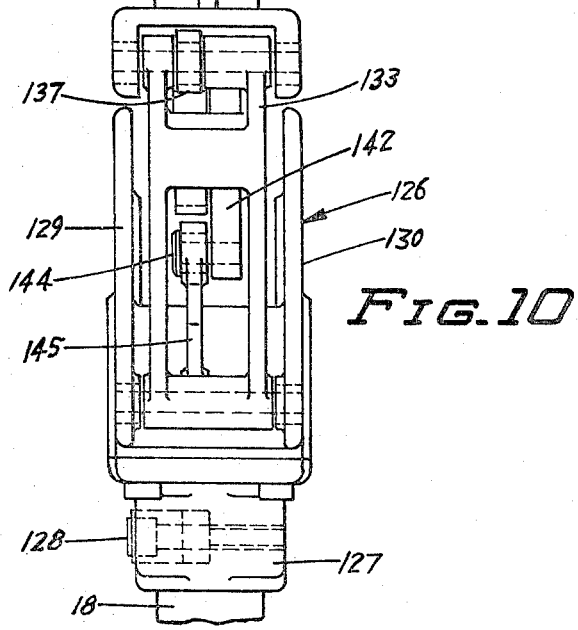

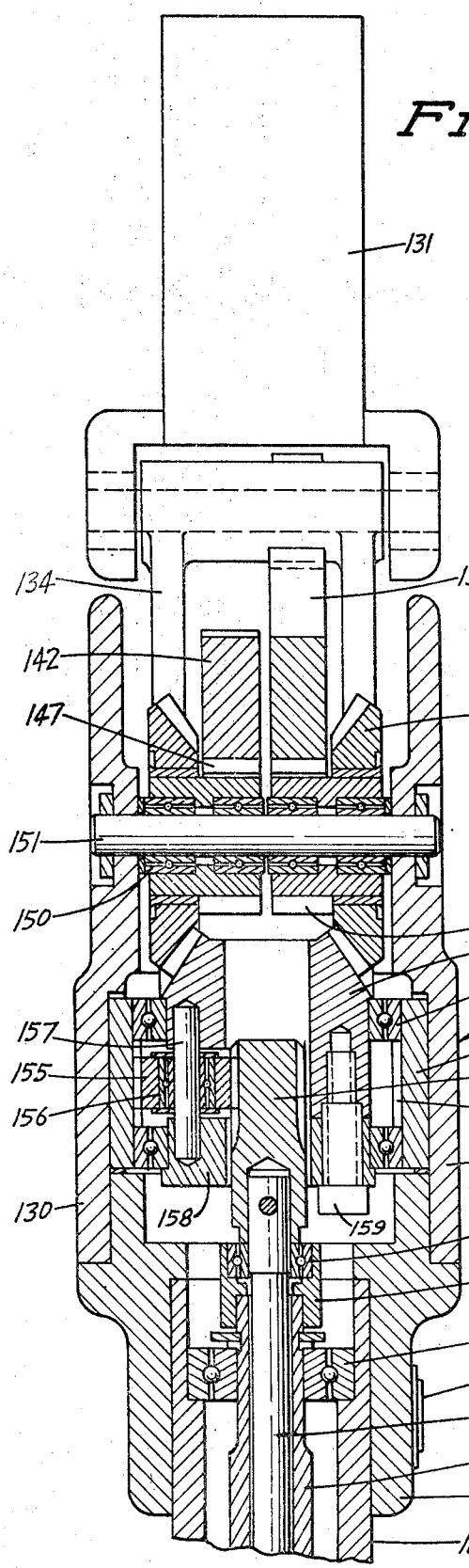

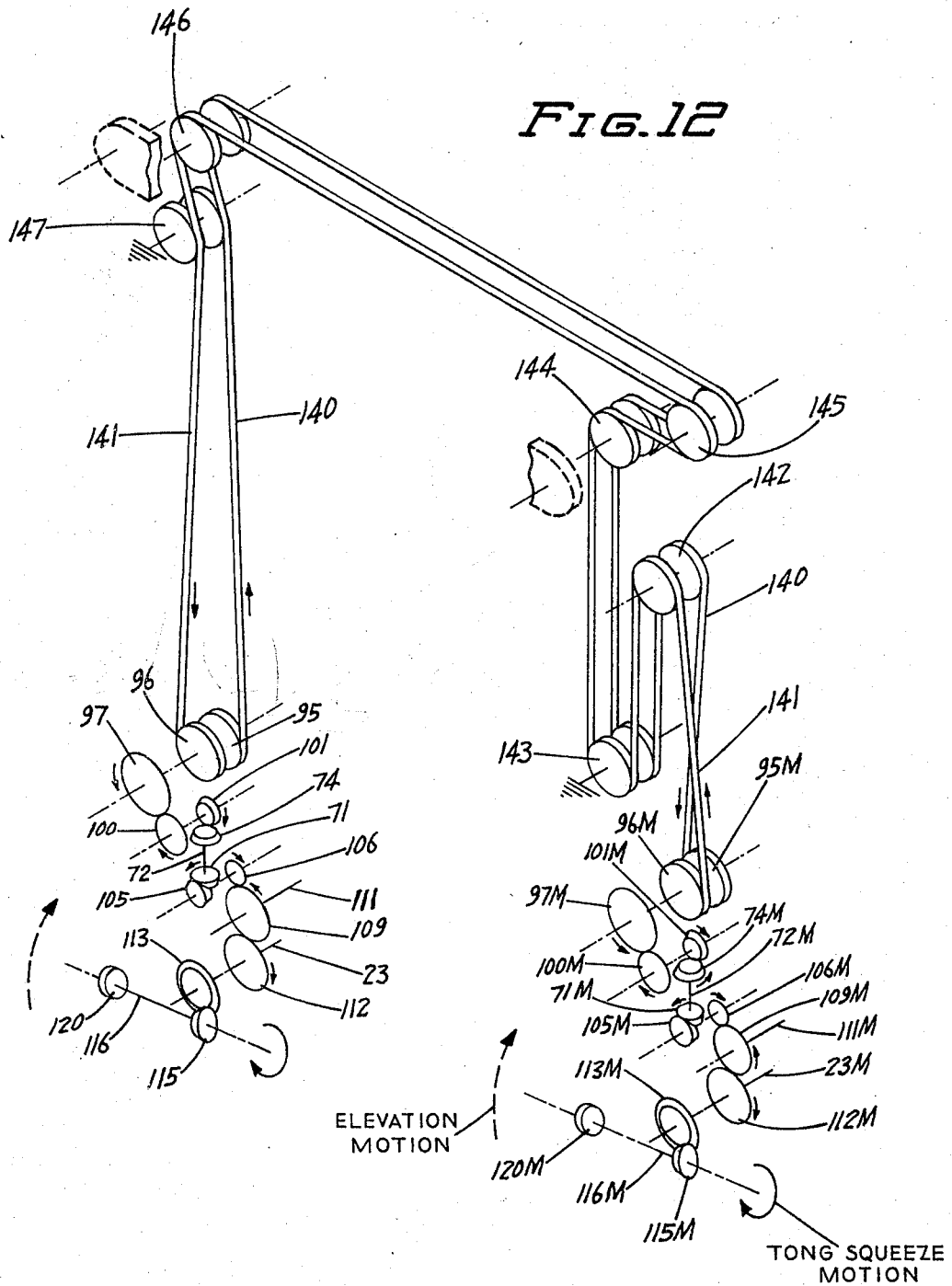

ROTARY TONG SQUEEZE SYSTEM

This application is in part a continuation-in-part of our copending application Ser. No. 814,265 filed Apr. 8, 1969 entitled SEALED WRIST JOINT.

This invention relates to a new and improved tong drive system comprising part of the wrist joints for the arms of a remote control manipulator of the type which is used by an operator to perform certain manipulative functions in some area remote from the operator as, for example, on the opposite side of a shielding wall. Such manipulators are well known and widely used. One such manipulator, to which the wrist joint of the present invention is especially adapted, is illustrated and described in U.S. Pat. No. 2,771,199 issued on Nov. 20, 1956 to Demetrius G. Jelatis, one of the instant coinventors. For purposes of illustration, the system of the present invention is described as part of such a master-slave manipulator, although the same tong drive system is adaptable to use in powered manipulators, servomanipulators, articulated manipulators and the like.

Master-slave manipulators of the type of said patent generally comprise a horizontal tubular support usually mounted in a sleeve or tube so as to extend through a generally vertical shielding wall and to be rotatable therein. A master arm is suspended from one end of the horizontal support on one side of the wall and a slave arm is suspended from the opposite end on the other side of the wall. Both master and slave arms include a relatively stationary portion which is attached to the horizontal support and rotates with it on its horizontal axis and a relatively movable portion which is movable longitudinally relative to the stationary portion. The relatively stationary portions are pivotally attached to the horizontal tubular support and movable on those pivots, whereas the relatively movable parts are movable toward and away from those pivots.

A handle is supported from the lower end of the movable part of the master arm to be engaged by the hand of the operator and by appropriate motions transmitted along the master arm through the horizontal support and along the slave arm controls the movement of a tong means supported from the lower end of the movable part of the slave arm. The wrist joint of the present invention provides the means by which the tong means are connected to the slave arm and function in response to motions transmitted from the handle.

It is common practice to actuate the tong means on the wrist joint of the slave arm using a single linear motion tape or cable from the handle on the wrist joint of the master arm and extending through the horizontal support to the tong. Such single linear motion means functions to close the tong. Springs comprising part of the tong mechanism are relied upon to return the handle and tong to their open position. If the friction in the tong system increases for any reason, the springs may not have sufficient force to open the tong upon relaxation of the handle means by the operator.

The wrist joint of the present invention includes a positive two-way rotary drive which allows the tong to be driven in both the opening and closing directions. This is accomplished by using not one but two linear elements which oppose one another. These opposing linear elements transmit motions from the master arm to tape drums in the wrist joint of the slave arm and then through appropriate gearing to directly drive the squeeze operating members of the tong assembly. This rotary tong squeeze system gives added flexibility in tong design. It allows greater force capacity in tong squeeze by allowing increase of squeeze force relative to tape tension. The direct two-way drive of the tong eliminates reliance on springs for tong opening. Because the linear elements can be pretensioned, less deflection is experienced during operation giving a more efficient system.

The invention is illustrated in the accompanying drawings in which:

FIG. 2 is a section on the line 2—2 of FIG. 1 and in the direction of the arrows;

FIG. 3 is a section on the line 3—3 of FIG. 1 and in the direction of the arrows;

FIG. 8 is a plan view of positively driven tong means shown in open position;

FIG. 9 is a similar plan view on reduced scale showing the tong means in closed position;

FIG. 10 is an end elevation;

FIG. 11 is a section on enlarged scale on the line 11—11 of FIG. 8 and in the direction of the arrows; and FIG. 12 is a schematic perspective view showing how operation of the handle on the master arm causes opening and closing of the tong carried by the slave arm.

Figure 1:
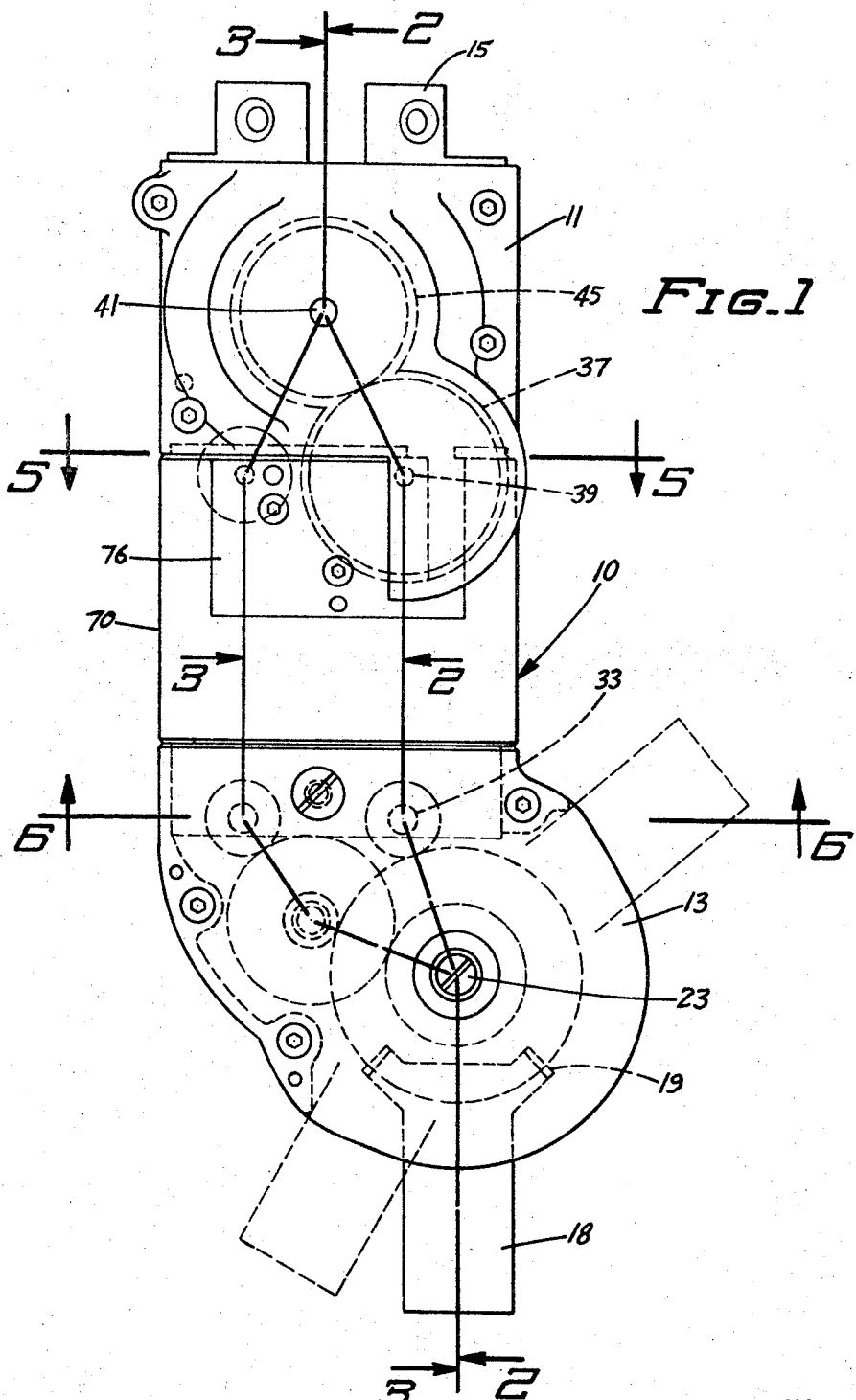
FIG. 1 is a side elevation of the wrist joint assembly, showing three vertically separable sections.

Referring now to the drawings, the wrist joint assembly as shown in elevation in FIG. 1 represents a right hand elevation from the operator's point of view of a slave arm wrist joint in normal at rest position. Another wrist joint in the same relative position is employed on the master arm. The master arm wrist joint may be generally of the type of copending application Ser. No. 774,467 or it may be any other type capable of transmitting handle motions, except that the tong drive must be of the type generally illustrated and described herein. In virtually all instances the manipulators of which the wrist joints form a part are employed in spaced pairs so that the operator, by means of the use of two master control arms, is able to manipulate two slave arms in order to reproduce the action of a pair of hands in the remote area on the other side of the shielding wall. To the extent feasible, to facilitate comparison with the wrist joint of applications Ser. No. 774,467 and No. 814,265, the same numbering systems are employed.

The wrist joint assembly, indicated generally at 10, is enclosed in a housing whose upper portion is composed of a pair of complementary generally semicylindrical shell members 11 and 12 and whose lower portion is composed of a pair of complementary downwardly and forwardly extending hollow shell members 13 and 14. The upper and lower sections of the housing are connected through an intermediate section 70 described in greater detail hereinafter. The top of the housing is open. Each of the upper housing members 11 and 12 is provided with a pair of upstanding arcuate ears 15 by means of which the wrist joint housing may be attached to the lower end of a slave arm boom tube and secured, as by means of screws. The remainder of the housing is closed except for a wide central slot 17 in the forward and downwardly extending surfaces of the lower housing portion to permit elevation movements of the handle and tong means to be transmitted by virtue of the tubular shank 18 of a bevel pinion 19 which extends through that slot.

The trunnions 23 of yoke 24 are journaled in a pair of ball bearings 25 carried in the opposite sidewalls of the lower portion of the assembly housing. A hollow tubular shaft 26 extends from yoke 24 and carries a pair of ball bearings 27 and 28 by means of which the tubular shank 18 of bevel pinion 19 is journaled for rotation about an axis perpendicular to the axis of rotation of the yoke trunnions. The tong means of the manipulator are carried by tubular shank 18. Bevel pinion 19 meshes with a pair of bevel differential gears 29 which are journaled by means of two pairs of ball bearings 30 to rotate on trunnions 23 of yoke 24 and are secured, as by means of screws 31 to spur gears 32 for rotation together.

A stationary shaft 33, whose ends are supported in the opposite sides of the lower portion of the intermediate housing portion, carries a pair of two-part gears 34—35 which are journaled by means of two pairs of ball bearings 36. Spur gear sections 34 mesh with spur gears 32 secured to the differential bevel gears 29. Bevel gear sections 35 mesh with bevel gears 71 at the ends of shafts 72 journaled in middle housing section 70, as described in detail hereinafter. Bevel gears 74 at the opposite ends of shafts 72 mesh with the bevel gear sections 75 of a two-part gear 75–37, each journaled by means of a pair of bearings 38 carried by fixed shaft 39 supported in the opposite sidewalls of the upper portion of the intermediate housing section.

The two-part elevation and twist tape drums are carried by a stationary horizontal shaft 41 whose ends are supported in opposite sidewalls of the upper portion of the wrist joint assembly housing. Each drum is composed of an inner flanged drum segment 42 and an outer flanged drum segment 44 mounted on a hub 43 having an outwardly extending gear toothed extension 45 whose teeth mesh with the teeth of spur gear section 37 of two-part gear 75–37. The tape drum assembly is journaled for rotation about shaft 41 by means of pairs of bearings 46. Both drum segments are of the same diameter and are secured to the toothed extension 45 of hub 43, as by means of screws 47, to rotate together as a unit.

As is well understood in the art, the elevation and twist tapes, or similar linear motion transmission elements, extend in opposite directions in their respective grooves or channels of the composite tape drum so that, as the drum is rotated, one tape is being wound about the drum as the other is being unwound.

Angular movement of the yoke 24 about the trunnions 23 is limited by means of the ends of the slot opening 17 in the wrist joint housing through which the shank of bevel gear 19 extends. Pin or peg 62 set in the differential gear 29—32 limits the movement of the differential gears in both directions by coming into engagement with screw 62A in the yoke body. This has the effect of limiting tape movements of the drums which are directly interconnected with the differential gears.

Figure 4:
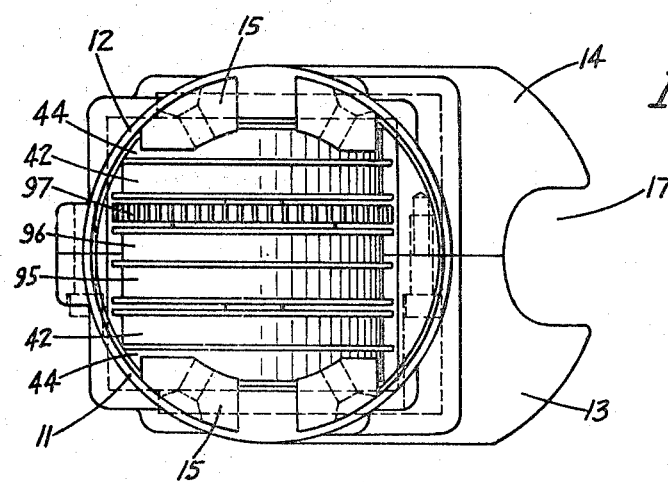
FIG. 4 is a top plan of the wrist joint assembly.
Figure 7:
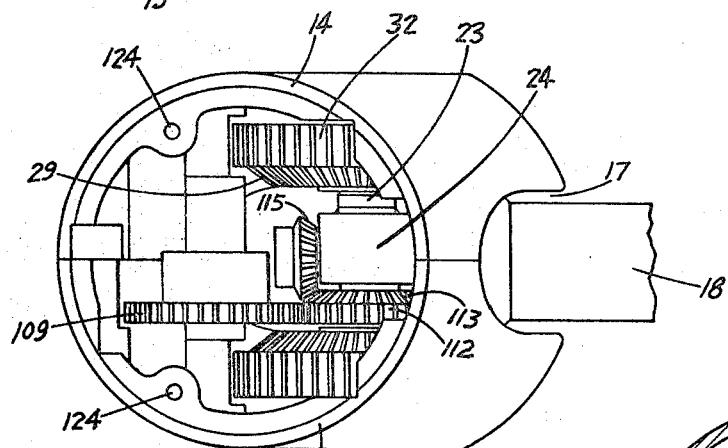
FIG. 7 is a top plan of the bottom section of the wrist joint.
Figure 5:
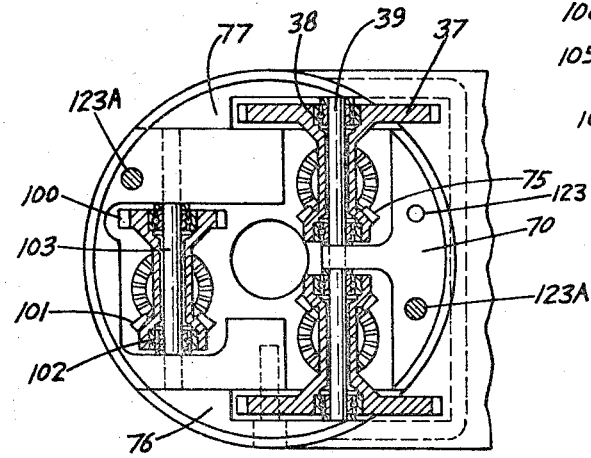
FIG. 5 is a horizontal section at the top of the intermediate section of the wrist joint taken along the line 5—5 of FIG. 1.
Figure 6:
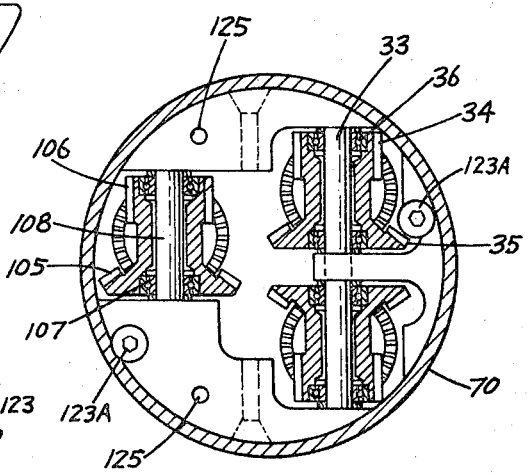
FIG. 6 is a horizontal section looking upwardly at the bottom of the intermediate section taken along the line 6—6 of FIG. 1.

The generally cylindrical intermediate housing section 70 is rigidly secured to the lower housing section, desirably in a half-lap butt joint, as shown. A pair of vertically extending arcuate side plates 76 and 77 are seated on shoulders on the upper surface on opposite sides of intermediate section 70. The ends of shaft 39 are carried in these side plates. The upper housing section is desirably fit with a half-lap butt joint rigidly secured to the top of the intermediate section. The upper housing shells 11 and 12 are shaped and enlarged as necessary to envelop the rotary elements housed within, as best seen in FIG. 4. The forward lower portions of shells 11 and 12 enclosing gears 37 overlap the side plates 76 and 77, as best seen in FIG. 2.

The intermediate section 70 is penetrated by a plurality of passages 78 through which shafts 72 extend. Each shaft 72 is supported by a pair of bearings 79 fit into the passages 78. As shown, each shaft 72 is encircled by a pair of spaced apart resilient seal rings 80. Each seal ring 80 is contained in a flanged retainer ring 81 which fits tightly and seats on an internal shoulder in passage 78.

The structure of the rotary tong squeeze system is as follows: A two-part tong squeeze tape drum, composed of flanged drum segments 95 and 96 and gear 97 secured together as by means of screws 98, is mounted for rotation on fixed shaft 41 by means of a pair of bearings 99. This drum is adapted to receive tapes wound in opposite directions around the drum, as already described in connection with the elevation and twist motions.

As best seen in FIG. 3, gear 97 engages and meshes with the spur gear portion 100 of a two-part gear including bevel gear section 101. The two-part gear 100—101 is mounted for rotation by means of a pair of bearings 102 on fixed shaft 103 carried in the upper portions of intermediate housing barrier section 70. Bevel gear portion 101 in turn engages a bevel gear 74 carried by one end of one of shafts 72 extending through the intermediate barrier wall section 70 and comprising part of a rotary seal which is in all respects as already described. Bevel gear 71 at the opposite end of shaft 72 on the opposite side of the double seal in turn engages a two-part gear composed of bevel gear section 105 and a spur gear section 106. Composite gear 105—106 is mounted by means of a pair of bearings 107 to rotate on fixed shaft 108 carried in the bottom portion of barrier wall section 70.

Gear section 106 engages gear 109 mounted for rotation by means of a pair of bearings 110 on stationary shaft 111 carried by the bottom housing portions 13 and 14. Gear 109 engages and meshes with the spur gear portion 112 of a composite gear having a bevel gear portion 113. Composite differential gear 112—113 is mounted by means of bearing 114 to rotate about trunnion 23 of yoke 24. The bevel gear portion 113 engages and meshes with a bevel gear 115 which is fixed to one end of a rotary shaft 116 extending through the yoke and hollow tubular shaft 26. One end of shaft 116 is journaled in bearing 117 in yoke 24 and the opposite end is journaled in bearing 118 in collar 119 secured to the end of hollow shaft 26. The opposite end of shaft 116 carries drive gear 120 for transmission of tong squeeze and tong opening motions to the tong means (not shown) from the handle at the end of the master arm.

As seen from the drawings, the upper and lower and intermediate barrier sections of the housing fit together in partially telescoping joints to form a compact rigid structure secured together, as by screws, in the conventional manner. Vertical hole 123 is provided in the upper surface of intermediate barrier housing section 70 for the insertion of a locating pin. A corresponding hole (not shown) is provided in the bottom surface of the upper housing section to insure proper orientation of the elements within the housing. Similarly, holes 124 are provided in the top of the bottom housing section for insertion of locating pins which fit into corresponding holes 125 in the bottom surface of the middle section 70 for orientation of the mechanisms of these sections. Fasteners 123A which are gasketed to the intermediate section 70 secure the intermediate section to the upper section.

The manner in which the rotary tong squeeze system of the slave wrist joint is operated in response to motion transmitted from the master arm is shown schematically in FIG. 12. The corresponding structural elements of the master arm wrist joint are identified by the same numerals followed by the suffix M. As the operator applies squeeze force to the handle of the master arm, this force is transmitted to drive gear 120M at one end of drive shaft 116M whose opposite end carries bevel gear 115M.

Shaft 116M rotates freely on its own longitudinal axis and rotates (with yoke 24 and shank 18 of bevel pinion 19) about the axis of trunnions 23M. The teeth of bevel gear 115M mesh with those of bevel gear 113M which rotates with spur gear 112M on the axis of the trunnions. The teeth of spur gear 112M in turn mesh with those of gear 109M which mesh with the teeth of spur gear section 106M of a two-part gear including bevel gear section 105M. The teeth of bevel gear 105M mesh with bevel gear 71M at one end of shaft 72M, the opposite end of which carries bevel gear 74M, the teeth of which mesh with the bevel gear portion 101M of a two-part gear, the other part of which is a spur gear portion 100M.

The teeth of spur gear 100M mesh with those of spur gear 97M which is mounted to rotate with tape drum segments 95M and 96M. The tapes 140 and 141 are secured, respectively, to drum segments 95M and 96M each extending in opposite directions so that upon rotation of the drum one tape is wound onto the drum as the other is unwound.

As is well understood in the art, the tapes extend up and over a pair of idlers 142 at the top of the master boom tube, down and around a pair of idlers 143 forming part of the azimuth assembly at the bottom of the master trunk tube, up and around two pairs of idlers 144 and 145 comprising part of the pivot structure at the top of the master trunk tube, through the horizontal support, around idlers 146 and 147 at the top of the slave arm trunk tube and thence to drum segments 95 and 96 in the slave wrist joint.

Tapes 140 and 141 are wrapped around drum segments 95 and 96 in the opposite direction from the opposite ends which are attached to drum segments 95M and 96M. Thus, as tape 141 is wound around drum segment 96M it unwinds from drum segment 96, and vice versa. At the same time, as tape 140 unwinds from drum segment 95M it is wound around drum segment 95.

Spur gear 97 which rotates with the tape drum 95—96 meshes with the teeth of spur gear portion 100 of a two-part gear, the bevel gear portion 101 of which meshes with the teeth of bevel gear 74 on one end of seal shaft 72. Bevel gear 71 at the opposite end of shaft 72 meshes with the bevel gear portion 105 of a two-part gear whose spur gear portion 106 meshes with the teeth of gear 109, which in turn meshes with the teeth of the spur gear portion 112 of the composite differential gear whose bevel gear portion 113 drives bevel gear 115 on the tong squeeze drive shaft 116. Drive pinion 120 operates the squeeze mechanism of the tong means.

When the handle and tong are driven in elevation rotation, the drive shafts 116 and 116M rotate through identical angles about the axis of trunnions 23 and 23M with yokes 24 and 24M. Similarly, in twist rotations the bevel pinions 18 and 18M are rotated through identical angles about the axes 116 and 116M. These rotations will result in identical rotations with respect to a fixed reference system of bevel gears 113 and 113M so that, even though the squeeze system gear train and coupling tapes are caused to move by these wrist joint rotations, there is no resultant rotation of shafts 116 and 116M with respect to the tong and handle structures, so that the tong opening remains unchanged if the master handle opening is held constant. Thus the squeeze system is by its structure automatically compensated and rendered independent of wrist elevation and twist rotations.

Although the rotary tong squeeze system according to the present invention is described and illustrated in the context of the sealed wrist joint of our copending application Ser. No. 814,265, the rotary tong squeeze mechanism is not limited to use in sealed wrist joints. Instead, the rotary seals and associated mechanism including shaft 72, bevel gears 71 and 74 and two-part spur-bevel gears 100—101 and 105—106 may be omitted and the teeth of spur gears 97 and 109 made to engage directly or through appropriate idlers.

A positive drive tong assembly especially adapted for use with the wrist joint of the present invention is illustrated in FIGS. 8 through 11. The tong assembly, indicated generally at 126, is attached to the shank 18 of the bevel pinion 19 by means of a sleeve 127 and a pair of wedges held in place by means of screws 128. The tong assembly housing includes a pair of parallel plates 129 and 130 mounted on the sleeve 127. The tong jaws 131 and 132 are supported by two pairs of parallel links 133—136 which are pivoted at one end on shafts held in the bases of the jaws and at the other end in shafts supported between the plates 129 and 130.

A link or actuating arm 137 controlling movement of jaw 131 is pivotally connected at one end of shaft 138 carried in the base of jaw 131. The opposite end of link 137 is pivotally connected at 139 to a relatively shorter link 140 whose opposite end is pivotally connected to shaft 141 carried between plates 129 and 130 on the opposite side of the tong assembly housing. Similarly, jaw 132 is controlled by link or actuating arm 142 pivotally connected at one end to shaft 143 in the base of the jaw and at the opposite end is pivotally connected at 144 to shorter link 145 whose opposite end is pivotally connected to shaft 146 in the tong assembly housing.

The inner convex arcuate edge surfaces of links 137 and 142 are each provided with spur gear teeth 147 (FIG. 8). The teeth 147 on the links 137 and 142 mesh with a pair of spur gears 148 which are permanently attached to bevel gears 149 and journaled by means of pairs of bearings 150 on shaft 151 secured in the side plates of the tong assembly housing. The composite spur bevel gears 148—149 are rotated in opposite directions to move the links 137 and 142 in opposite directions by bevel drive gear 152 whose teeth mesh with the teeth of the bevel gear sections of the composite gears.

Bevel drive gear 152 is journaled for rotation within a sleeve 153 within the tong assembly housing by means of a pair of bearings 154. The bevel drive gear 152 is the planet carrier for a planetary gear reduction, multiple spur gears 155 being mounted for rotation by bearings 156 on shafts 157. The axes of rotation of planetary spur gears 155 are parallel to that of the drive bevel gear 152. Shafts 157 are held in the body of the drive bevel gear and ring 158 secured to the drive bevel gear body by means of screw 159, or the like. The teeth of multiple planetary spur gears 155 mesh with those of drive pinion 120A secured to the end of shaft 116 of the wrist joint and internal ring gear 160 carried in sleeve 153 and the planetary gears are rotated in response to manipulation of the master handle, as already described. The planetary gear set reduces the torque that the small shaft 116 must transmit.

The embodiments of the invention in which an exclusive property or privilege is claimed are defined as follows:

We claim:

1. A wrist joint for a remote control manipulator comprising:
   A. a housing including upper and lower portions;
   B. a plurality of takeup means for linear motion transmission elements journaled to rotate within the upper portion of said housing, each of said takeup means being rotatable independently and each having a pair of circumferential channels for receiving linear motion transmission elements wrapped in opposite directions;
   C. gear means secured to each of said takeup means;
   D. one of said takeup means controlling tong squeeze operation;
   E. means including a plurality of spur gears journaled in the lower portion of said housing;
   F. means operatively connecting the gears of said takeup means with said spur gears;
   G. work performing means carried by the lower portion of the wrist joint including tong means;
   H. rotary tong squeeze drive means in the lower portion of the wrist joint comprising a shaft pivotable about an axis parallel to the axes of rotation of the takeup means and spur gears and also rotatable about an axis normal thereto; and
   I. means operatively connecting said spur gears to said work performing means, one of said spur gears being operatively connected to said tong squeeze drive means for controlling tong squeeze operation.

2. A wrist joint according to claim 1 further characterized in that:
   A. a yoke is journaled for limited pivotal rotation in the lower part of said housing;
   B. said spur gears are journaled on the trunnions of said yoke; and
   C. a differential bevel gear is journaled to rotate with each of said spur gears.

3. A manipulator wrist joint according to claim 2 further characterized in that:
   A. a bevel pinion is supported from said yoke and journaled for rotation about an axis perpendicular to the axis of rotation of said differential bevel gears, the teeth thereof engaging the teeth of one pair of said differential gears;
   B. said bevel pinion has an elongated shank extending through a slot in the lower portion of said housing;
   C. said tong squeeze drive shaft extends through and is journaled for rotation within said bevel pinion on the axis of rotation thereof;
   D. one end of said drive shaft is operatively connected to drive said tong means; and
   E. the other end of said drive shaft is operatively connected to be driven from the one of said differential bevel gears operatively connected to the takeup means for controlling tong operation.

4. A wrist joint according to claim 3 further characterized in that said tong means includes:
   A. a tong housing secured to the shank of said bevel pinion;
   B. a pair of reciprocal jaws pivotally secured to links pivotally secured in said tong housing;
   C. a pair of actuating arms each connected to one of said jaws;

D. gear teeth in each of said arms;
E. a pair of spur gears in said tong housing, the teeth of said gears engaging the teeth in said arms; and
F. drive means operatively connecting said spur gears with said tong squeeze drive shaft.

5. A wrist joint according to claim 4 further characterized in that:
A. said tong squeeze drive shaft has a drive pinion at one end;
B. said spur gears in said tong housing are each fixed to rotate with a bevel gear on the same axis;
C. a further bevel pinion is journaled in said tong housing, the teeth thereof engaging the teeth of both of said last named bevel gears;
D. said further bevel pinion being operatively connected to be driven by the drive pinion on said tong squeeze drive shaft.

6. A wrist joint according to claim 1 further characterized in that said tong means includes:
A. a tong housing secured in the lower portion of the wrist joint;
B. a pair of reciprocal jaws pivotally secured to links pivotally secured in said tong housing;
C. at least one actuating arm connected to one of said jaws;
D. gear teeth in said arm;
E. at least one spur gear in said tong housing, the teeth of said gear engaging the teeth in said arm; and
F. drive means operatively connecting said spur gear with said tong squeeze drive shaft.

7. A wrist joint for the slave arm of a remote control master-slave manipulator comprising:
A. a housing including separate upper and lower portions;
B. a plurality of takeup means for linear motion transmission elements journaled to rotate within the upper portion of said housing, each of said takeup means being rotatable independently and each having a pair of circumferential channels for receiving linear motion transmission elements wrapped in opposite directions;
C. gear means secured to each of said takeup means;
D. one of said takeup means controlling tong squeeze operation;
E. a yoke journaled for limited pivotal movement in the lower portion of said housing;
F. a plurality of spur gears journaled on the trunnions of said yoke;
G. means operatively connecting the gears of said takeup means to said spur gears;
H. a plurality of differential bevel gears journaled to rotate with said spur gears;
I. work performing means carried by the lower portion of the wrist joint including tong means;
J. tong squeeze drive means comprising a shaft extending through said yoke, said shaft being rotatable about an axis normal to the axis of rotation of the yoke and pivotable with the yoke, a bevel gear on one end of said shaft and a drive pinion on the other end; and
K. means operatively connecting said bevel gears to said work performing means, one of said differential bevel gears being operatively connected to the bevel gear of said tong squeeze drive means for controlling tong squeeze operation.

8. A manipulator wrist joint according to claim 7 further characterized in that:
A. a bevel pinion is supported from said yoke and journaled for rotation about an axis perpendicular to the axis of said spur gears and differential bevel gears, the teeth thereof engaging the teeth of one pair of said differential gears;
B. said bevel pinion has an elongated shank extending through a slot in the lower portion of said housing;
C. said tong squeeze drive shaft extends through and is journaled for rotation within said bevel pinion on the axis of rotation thereof;
D. one end of said drive shaft is operatively connected to drive said tong means; and
E. the other end of said drive shaft bearing said bevel gear is operatively connected to be driven from the one of said differential bevel gears operatively connected to the takeup means for controlling tong operation.

9. A wrist joint according to claim 8 further characterized in that said tong means includes:
A. a tong housing secured to the shank of said bevel pinion;
B. a pair of reciprocal jaws pivotally secured to links pivotally secured in said tong housing;
C. a pair of actuating arms each connected to one of said jaws;
D. gear teeth in each of said arms;
E. a pair of spur gears in said tong housing, the teeth of said gears engaging the teeth in said arms; and
F. drive means operatively connecting said spur gears with said tong squeeze drive shaft.

10. A wrist joint according to claim 9 further characterized in that:
A. said tong squeeze drive shaft has a drive pinion at one end;
B. said spur gears in said tong housing are each fixed to rotate with a bevel gear on the same axis;
C. a further bevel pinion is journaled in said tong housing, the teeth thereof engaging the teeth of both of said last named bevel gears;
D. said further bevel pinion being operatively connected to be driven by the drive pinion on said tong squeeze drive shaft.

PO-1050
(5/69)

UNITED STATES PATENT OFFICE
CERTIFICATE OF CORRECTION

Patent No. 3,572,807　　　　　　　　Dated　March 30, 1971

Inventor(s) Lester W. Haaker et al

It is certified that error appears in the above-identified patent and that said Letters Patent are hereby corrected as shown below:

In the heading, column 1, line 9, parent application Serial 814,265 is not "abandoned" as shown, but is --now Patent No. 3,543,592. --. Column 8, line 14, after "axis", second occurr insert -- of rotation --.

Signed and sealed this 3rd day of August 1971.

(SEAL)
Attest:

EDWARD M. FLETCHER, JR.　　　　　WILLIAM E. SCHUYLER,
Attesting Officer　　　　　　　　Commissioner of Paten